United States Patent
Suzuki et al.

(10) Patent No.: US 6,709,781 B2
(45) Date of Patent: Mar. 23, 2004

(54) SEPARATORS FOR SOLID POLYMER FUEL CELLS AND METHOD FOR PRODUCING SAME, AND SOLID POLYMER FUEL CELLS

(75) Inventors: Noriyuki Suzuki, Futtsu (JP); Yuichi Yoshida, Futtsu (JP); Tsutomu Haeno, Futtsu (JP); Hiroshi Kihira, Futtsu (JP)

(73) Assignee: Nippon Steel Corporation, Tokyo (JP)

( * ) Notice: Subject to any disclaimer, the term of this patent is extended or adjusted under 35 U.S.C. 154(b) by 351 days.

(21) Appl. No.: 09/900,657

(22) Filed: Jul. 6, 2001

(65) Prior Publication Data

US 2002/0004158 A1 Jan. 10, 2002

(30) Foreign Application Priority Data

Jul. 7, 2000 (JP) ........................ 2000-206602
Sep. 4, 2000 (JP) ........................ 2000-267342

(51) Int. Cl.[7] ................................. H01M 2/00
(52) U.S. Cl. ..................... 429/34; 429/35; 429/36; 429/38; 429/39
(58) Field of Search ..................... 429/34, 35, 36, 429/38, 39

(56) References Cited

U.S. PATENT DOCUMENTS 6,413,663 B1 * 7/2002 Mercuri ....................... 429/30
6,521,369 B1 * 2/2003 Mercuri et al. ............... 429/40
6,524,452 B1 * 2/2003 Clark et al. .................. 204/254
6,544,681 B2 * 4/2003 McLean et al. ............... 429/39

FOREIGN PATENT DOCUMENTS

| JP | 4-247852 | 9/1992 |
|---|---|---|
| JP | 4-358044 | 12/1992 |
| JP | 5-029009 | 2/1993 |
| JP | 6-264193 | 9/1994 |
| JP | 6-293941 | 10/1994 |
| JP | 7-188870 | 7/1995 |
| JP | 8-165546 | 6/1996 |
| JP | 8-225892 | 9/1996 |
| JP | 8-311620 | 11/1996 |
| JP | 9-27672 | 1/1997 |
| JP | 10-228914 | 8/1998 |
| JP | 2000-256808 | 9/2000 |
| JP | 2001-006713 | 1/2001 |

* cited by examiner

Primary Examiner—Bruce F. Bell

(57) ABSTRACT

A highly durable separator for solid polymer fuel cells that can be produced at low cost and that is characterized by the separator having a flat portion in the peripheral portion and channels in the central portion composed of protruded portions and recessed portions which provide flow paths for gases on the front surface and the back surface, and the shape of each channel end portion being tilted.

13 Claims, 9 Drawing Sheets

☐ PROTRUDED PORTIONS
▨ TILTED PORTIONS (PROTRUDED)
▦ FLAT PORTION
▨ TILTED PORTIONS (RECESSED)
■ RECESSED PORTIONS

SEPARATORS FOR SOLID POLYMER FUEL CELLS AND METHOD FOR PRODUCING SAME, AND SOLID POLYMER FUEL CELLS

BACKGROUND OF THE INVENTION

1. Field of the Invention

The present invention relates to separators, used as constituent parts of solid polymer fuel cells that are used for automobiles using electric power as a direct driving source and a small-scale generation systems, and a method for producing the same, and solid polymer fuel cells formed with the separators.

2. Description of the Related Art

Use of electricity-driven automobiles, using solid polymer fuel cells that utilize hydrogen in place of currently used internal combustion engines that utilize fossil fuel, and replacement central generation systems with dispersed cogeneration systems has been encouraged, because the importance of an unpolluted environment has been recognized.

In order for the new technologies to be widely and commonly utilized, development of technologies related to cutting the cost of solid polymer fuel cells and making the fuel cells highly reliable, as well as providing fuel supply systems, must be advanced.

The success of development of solid polymer materials for fuel cells has rapidly advanced the development of fuel cells for electric automobiles in recent years.

Solid polymer fuel cells differ from conventional alkali fuel cells, phosphoric acid fuel cells, molten carbonate fuel cells, solid oxide fuel cells and the like. The solid polymer fuel cells are fuel cells that comprise organic films which are classified as a hydrogen-ion-selective-permeation type as an electrolyte. The solid polymer fuel cells are based on a system that generates power by using as a fuel pure hydrogen, a hydrogen gas obtained by modifying alcohols, or the like, and electrochemically controlling the reaction of hydrogen with oxygen in the air.

Since a solid polymer film firmly fixes an electrolyte in the film even when the film is thin, accurate control of a dew point within the cells makes the electrolyte function as an electrolyte. Accordingly, the solid polymer fuel cells do not require the use of a flowable medium such as an aqueous electrolyte and a molten salt electrolyte. The solid polymer fuel cells are therefore characterized by that the cells themselves can be compact and simple.

The solid polymer fuel cells have, as a unit cell, a sandwich structure comprising a separator having a hydrogen flow path, a fuel electrode, a solid polymer film, an air (oxygen) electrode and a separator having an air (oxygen) flow path. Practically, the solid fuel cells are formed from a stack obtained by stacking the unit cells. Accordingly, both sides of the separator each have an independent flow path. That is, one side has a hydrogen flow path, and the other side has a flow path for air and the water thus produced.

A carbon material which can fully display corrosion resistance and durability in an environment where the operation temperature is not very high and in which optional flow shapes can further be formed is used, after processing such as machining, as a constituent material of the solid polymer fuel cells that are operated in a temperature region of up to the boiling point of a cooling aqueous solution. Development of technologies for using stainless steel or titanium as the above constituent material has been advanced in order to reduce the cost and size and, namely, in order to make the separator thin.

There has heretofore been used a stainless steel, for fuel cells, that can be operated in a molten carbonate environment requiring a high corrosion resistance, as disclosed in Japanese Unexamined Patent Publications (Kokai) No. 4-247852, No. 4-358044, No. 7188870, No. 8-165546, No. 8-225892 and No. 8-311620, and the like references.

Moreover, Japanese Unexamined Patent Publications (Kokai) No. 6-264193, No. 6-293941 and No. 9-67672, and the like, disclose solid electrolyte fuel cell materials that can be operated at temperatures as high as several hundred degrees centigrade.

Furthermore, Japanese Unexamined Patent Publication (Kokai) No. 10-228914 discloses a separator for a fuel cell that has been developed for the purpose of decreasing the contact resistance against the electrode of the unit cell, and that is characterized by press forming a stainless steel (SUS 304) to form a stretch formed portion composed of many recesses and protrusions in the inner peripheral portion, and forming a gold plating layer from 0.01 to 0.02 $\mu$m thick on the end face of the stretched tip of the stretch formed portion. The patent publication further discloses technologies for the method of using the separators for fuel cells, which comprises allowing each of the separators to intervene between stacked two unit cells, and arranging the electrodes of the unit cell so that each of the electrodes is in contact with the gold plating layer formed on the end face on the stretched tip of each of the stretch formed portions, resulting in the formation of reaction gas paths between the separator for fuel cells and the electrode. Moreover, Japanese Unexamined Patent Publication (Kokai) No. 5-29009 discloses "perforated bipolar plates" in a corrugated shape obtained, by pressing, at low cost.

However, the present inventors have actually prepared solid polymer fuel cells on the basis of the disclosed technologies, and found that the disclosed technologies have the following four technological problems.

a) The alloy components of SUS 304, that is a general-purpose steel, sometimes become unsatisfactory as stainless steel separators in the environment of solid polymer fuel cells where long-term durability is required. In order to take countermeasures, the contents of Cr, Ni, Mo, etc. must be increased.

b) For a stainless steel in which the contents of Cr, Ni, Mo, etc. are increased, when the stainless steel is plated with gold by wet gold plating alone, a passivated oxide film of the stainless steel remains without being completely reduced during gold plating. As a result, an interlayer resistance is sometimes produced between the stainless steel and the gold plating layer to cause a power loss. In order to take countermeasures, a noble metal must be allowed to adhere to the stainless steel while the passivated oxide film of the stainless steel is being removed.

c) A form of a separator obtained by press forming a stretch formed portion composed of many recesses and protrusions in the inner periphery portion can be assumed as the form of a separator. However, when an attempt is made to work a separator part having flat portions around the periphery, ductile cracks are formed in the stretch formed portion composed of recesses and protrusions. Moreover, the stainless steel in which the contents of alloy components are increased, to improve long term reliability, is difficult to press form into a separator having the above form because the steel shows lowered workability compared with that of SUS 304. Furthermore, when the separator has a cross section in a corrugated shape, the area contacted with an electrolytic film of the separator is decreased to make the fuel cell characteristics poor.

d) When the form of a separator having a stretch formed portion composed of many recesses and protrusions in the inner peripheral portion is assumed as the form of the separator, a reaction gas freely flows along a space between the separator and the electrode in the resultant structure. There arise the following problems in this case: the gas does not flow uniformly from the gas inlet to the gas outlet, and the reaction efficiency lowers, the gas flow speed is low, and water formed on the oxygen side is discharged with difficulty.

The present inventors have already proposed means for solving the problems mentioned in a) and b) in Japanese Unexamined Patent Publications (Kokai) No. 2000-256808 (Application No. 11-62813) and No. 2000-006713 (Application No. 11-170142).

SUMMARY OF THE INVENTION

In view of the problems in c) and d) mentioned above, an object of the present invention is to provide press formable separators for solid polymer fuel cells and method for producing the same, and further provide highly durable solid polymer fuel cells, at low cost, in which the separators are used.

In order to solve the above problems, the present inventors have examined in detail the material behavior at the time of press forming separators on the basis of the functional principle of the solid polymer fuel cells, and achieved the present invention based on the results. The gists of the present invention are as described below.

(1) A separator for solid polymer fuel cells, comprising a flat peripheral portion and continuous channels in the central portion composed of protruded portions and recessed portions which provide flow paths for gases on the front surface and the back surface of the central portion, is characterized by the channel end portions of each of the channels being tilted.

(2) The separator for solid polymer fuel cells according to (1) mentioned above, wherein the tilting angle θ (degrees) of the channel end portions is varied from channel to channel.

(3) The separator for solid polymer fuel cells according to (1) or (2) mentioned above, wherein the depth H (mm) of each channel is made equal to or less than a value calculated by the following formula:

$$H = 2 \times W \times (EL/YS)^{1.01} \times (R/T)^{0.318} \times (1-W/P)^{2.66}$$

wherein P (mm) is a channel pitch of the channel, R (mm) is a radius of the shoulder portion of the channel, W (mm) is a length of the parallel portion of the channel, t (mm) is a thickness of the separator, EL (%) is an elongation of a material used for the separator and YS (kgf/mm$^2$) is a yield stress of the material used therefor.

(4) The separator for solid polymer fuel cells according to any one of (1) to (3) mentioned above, wherein the tilting angle θ (degrees) of each channel end portion is made equal to or less than a value calculated by the following formula:

$$\theta = 90 \times (EL/YS)^{0.372} \times (R/t)^{0.270} \times (W/t)^{-0.265}$$

wherein R (mm) is a radius of the shoulder portion of the channel, W (mm) is a length of the parallel portion of the channel, t (mm) is a thickness of the separator, EL (%) is an elongation of a material used for the separator and YS (kgf/mm$^2$) is a yield stress of the material used therefor.

(5) The separator for solid polymer fuel cells according to (1) mentioned above wherein, in the transverse cross section of a gas flow path formed by the repetition of a protruded portion and a recessed portion of the channel, the outside surface of each protruded portion and that of each recessed portion each have a flat portion and the shoulder portion of each protruded portion and that of each recessed portion each have a curved portion having a constant curvature.

(6) The separator for solid polymer fuel cells according to (5) mentioned above, wherein the connecting portion of the flat portion and the shoulder portion has a bent portion.

(7) The separator for solid polymer fuel cells according to (5) or (6) mentioned above, wherein the entire upper bottom portion and the entire lower bottom portion on the inside surfaces of the protruded portion and the recessed portion are curved with a constant curvature.

(8) The separator for solid polymer fuel cells according to any one of (5) to (7) mentioned above, wherein the following formula is satisfied:

$$EL \geq 50 \cdot t/R$$

wherein R (mm) is a curvature of the shoulder portion, or the upper bottom portion and the lower bottom portion, EL (%) is an elongation of the above material, and t (mm) is a thickness of the above plate.

(9) The separator for solid polymer fuel cells according to any one of (1) to (8) mentioned above, wherein the separator has a seal member that seals both flat faces of the peripheral portion.

(10) The separator for solid polymer fuel cells according to any one of (1) to (9) mentioned above, wherein the cross-sectional area of the channel increases toward the downstream end of the gas flow path.

(11) The separator for solid polymer fuel cells according to any one of (1) to (10) mentioned above, wherein the separator is made of a stainless steel or titanium.

(12) A method for producing a separator for solid polymer fuel cells, comprising press forming with a mold having a configuration similar to the external shape of the separator for solid polymer fuel cells according to any one of (1) to (11) mentioned above.

(13) Solid polymer fuel cells comprising the separators for solid polymer fuel cells according to any one of (1) to (11) mentioned above.

DESCRIPTION OF THE PREFERRED EMBODIMENTS

The present invention will be explained in detail by making reference to drawings.

Figure 1:
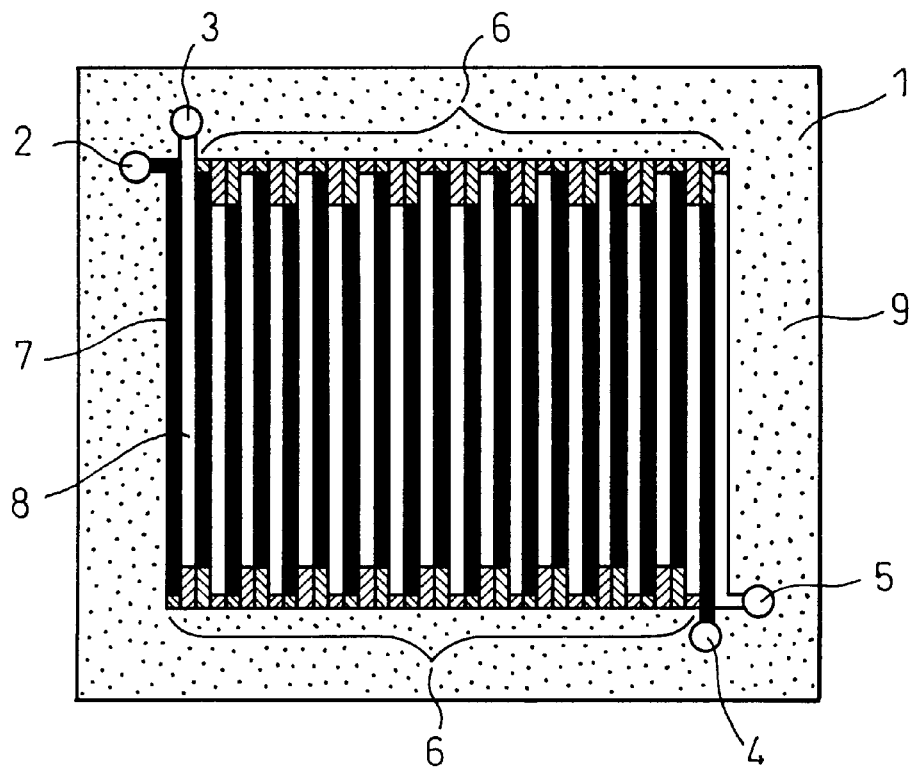
FIG. 1 is a plan view illustrating a separator of the present invention.

FIG. 1 shows a plan form of a separator according to the present invention. Moreover, FIG. 2 and FIG. 3 show one embodiment of a structure obtained by stacking channel end portions 6, seal plates 10 and carbon fiber current collectors 11 that are electrodes.

A hydrogen-containing fuel gas or oxygen (air) supplied from a gas inlet 2 or 3 flows along recessed portions 7 alone on the front surface side or protruded portions 8 alone on the back surface side, and is discharged from an outlet 4 or 5. The fuel gas and oxygen (air) flow separately, and never mix with each other.

Figure 2:
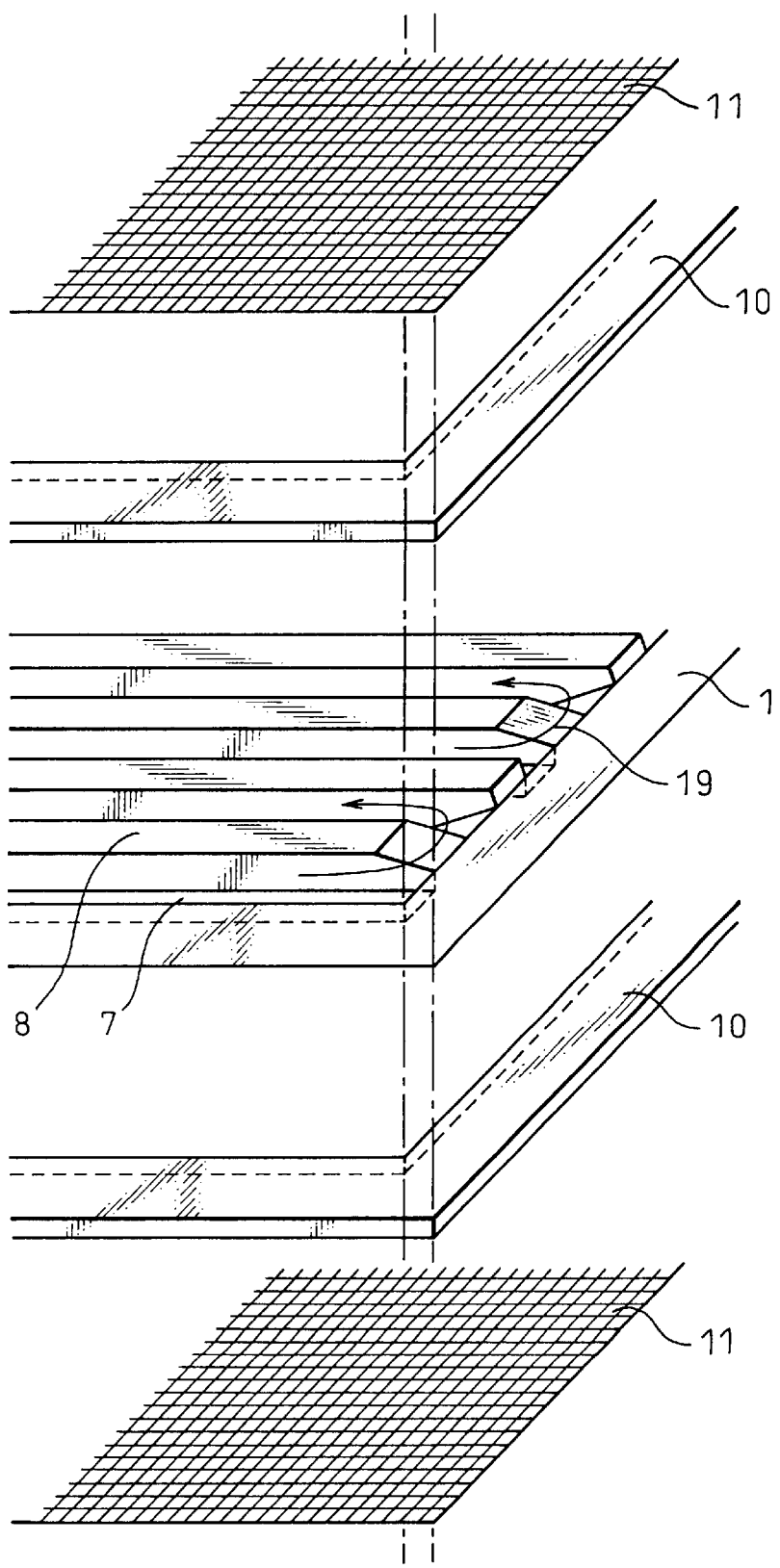
FIG. 2 is a schematic view illustrating a stack structure in which separators of the present invention are used.
Figure 3:
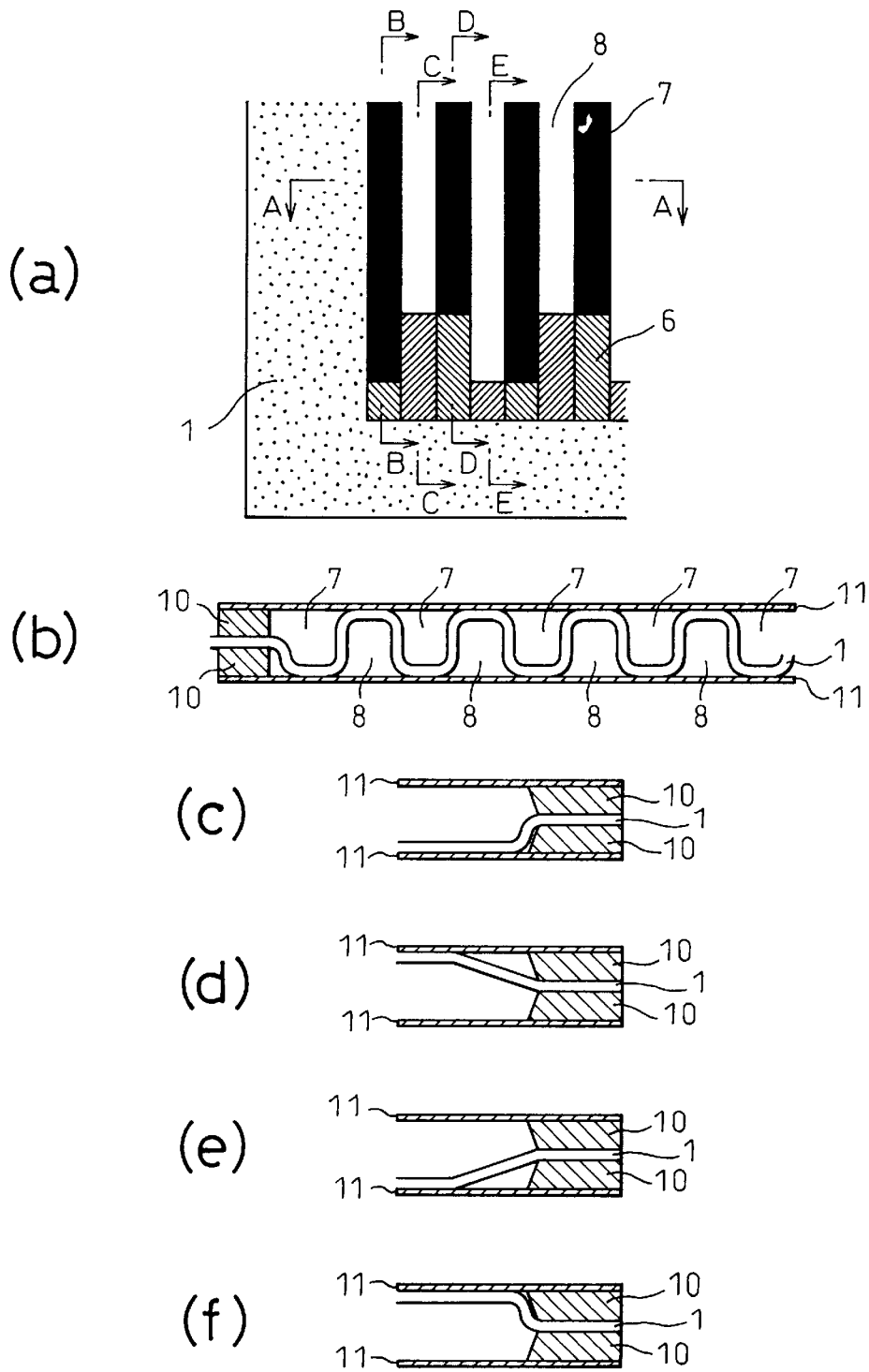
FIG. 3 shows views showing the embodiment of the end portions of a channel in a separator of the present invention, wherein (a) is a plan view showing the enlarged end portion, (b) is a cross-sectional view of the end portion along A—A in the above plan view, (c) is a cross-sectional view along B—B in the above plan view, (d) is a cross-sectional view along C—C in the above plan view, (e) is a cross-sectional view along D—D in the above plan view, and (f) is a cross-sectional view along E—E in the above plan view.

The gas flow on the front surface side in the channel end portions is shown by arrows in FIG. 2.

In the channel end portions 6, the tilting angle of protruded portions is made steeper every two protruded portions, and the tilting angle of recessed portions is made steeper every two recessed portions. As a result, the fuel gas or oxygen (air) is prevented from taking a shortcut, and is returned in the channel end portions. The fuel gas or oxygen (air) can thus be allowed to flow uniformly over the entire gas flow path of the separator. Moreover, since the flow speed of the gas can be increased, the discharge of water formed on the oxygen side is easy. Diversion of the gas on the downstream side can further be suppressed by making the seal plate 10 slightly thicker than the channel heights of the separator 1, and making the angle of the end face in the cut-out portion in the central portion of the seal plate 10 slightly larger than the maximum tilting angle of the channel end portions described above.

Figure 4:
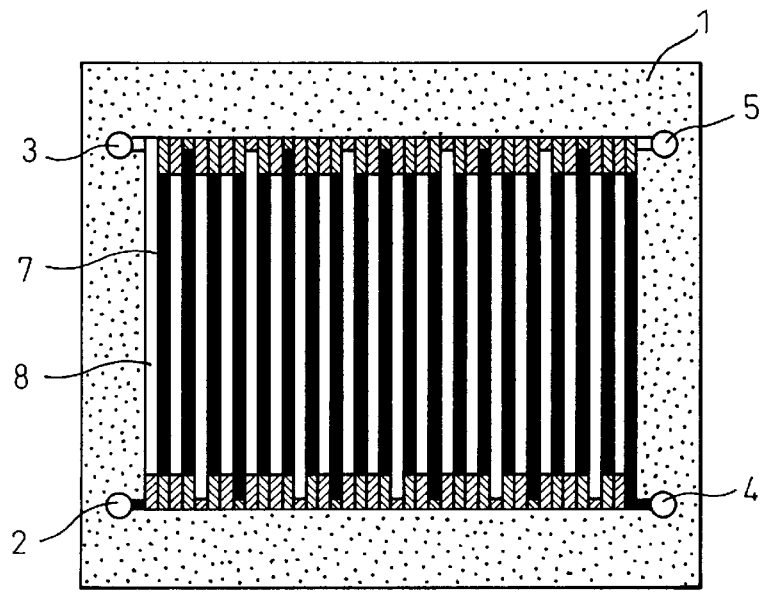
FIG. 4 is a plan view illustrating another separator of the present invention.
Figure 5:
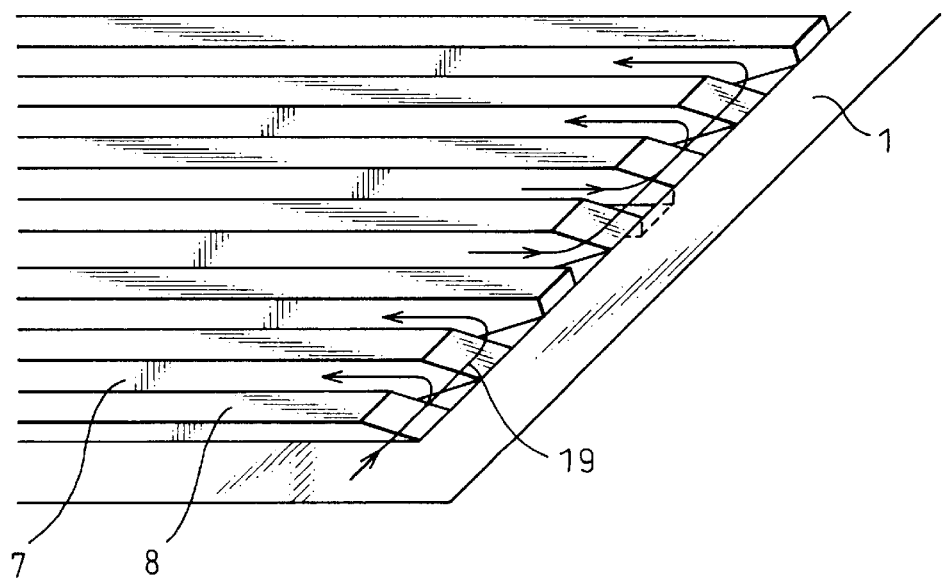
FIG. 5 is a view showing the enlarged end portions of a channel in another separator of the present invention.

FIGS. 4, 5 show an embodiment of the arrangement of channels in which the tilting angle of the protruded portions or recessed portions is made steeper every four protruded portions or recessed portions, in the channel end portions.

The gas flow on the front surface side in the channel end portions is shown by arrows in FIG. 5. FIG. 5 shows a flow structure wherein a gas flows along two channels in parallel, the gas is then mixed in the turning portions in the end portions, and the gas is branched again and flows along two lines.

Although the flow speed of the gas in the parallel portions of the channel lowers to some degree in comparison with the arrangement in FIG. 1 explained above, the effect of decreasing a pressure loss is obtained. It is needless to say that the arrangement of the channel wherein the tilting angle of a channel end portion is made steep or less steep is not restricted to the above two embodiments, and the arrangement should be optionally selected in view of the capacity of a gas supply apparatus, power generation efficiency, and the like.

Various flow patterns can thus be formed by making the tilting angle of a channel end portion steeper or less steep.

Graphite plates, metal plates or the like can be used as a separator material in view of the electron conductivity, corrosion resistance and air-tightness. However, a stainless steel or titanium is preferred because the material can be made thin and press formed.

Figure 6:
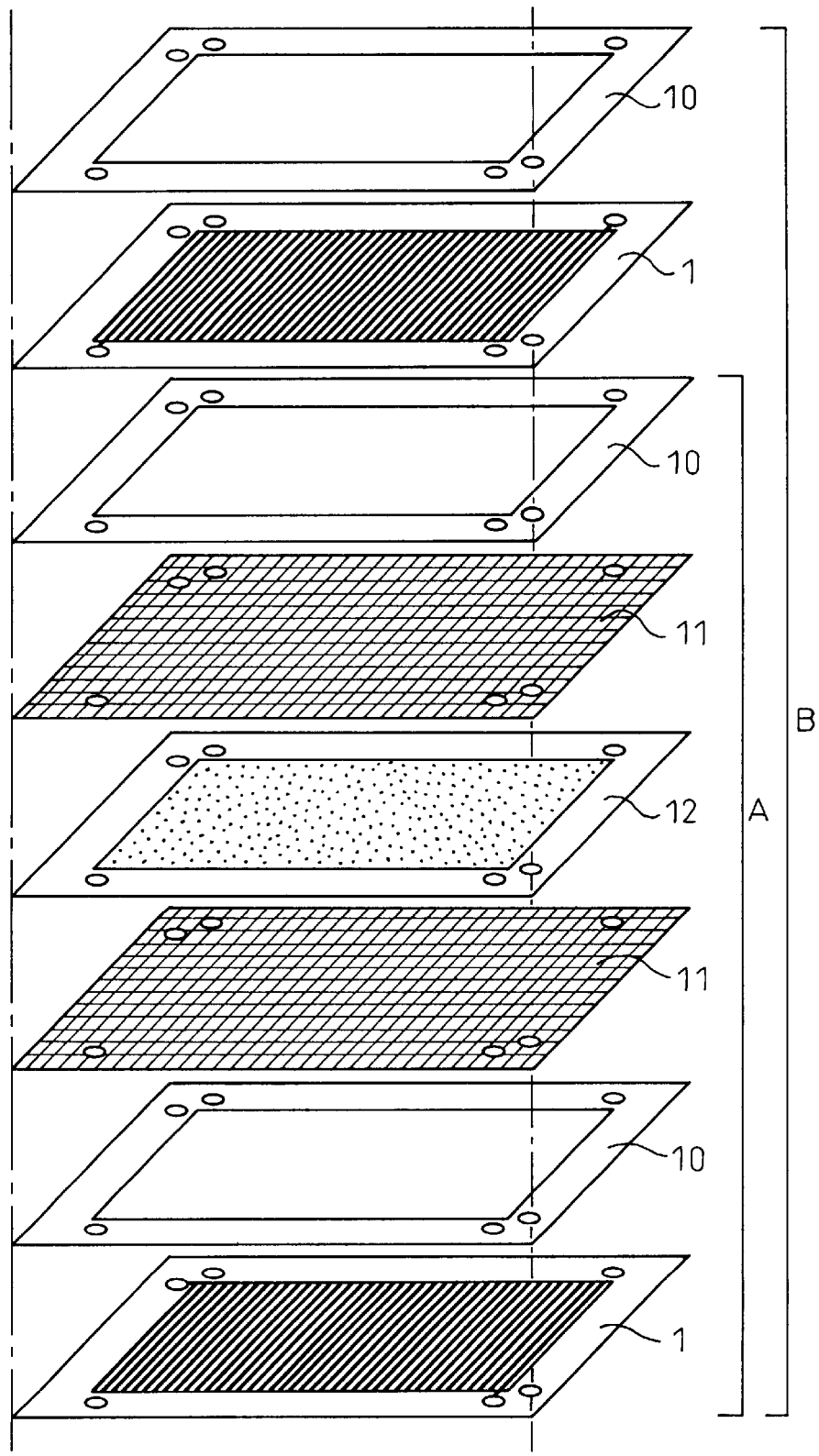
FIG. 6 is a schematic view showing one embodiment of building a stack of fuel polymer fuel cells using separators of the present invention.

FIG. 6 shows an embodiment of a fuel cell stack structure formed with separators of the invention and seal plates.

The fuel cells are a stack structure of separators 1, seal plates 10 and carbon fiber current collectors 11 that are electrodes. A unit cell is formed by sandwiching a solid polymer film 12 coated with an electrode catalyst on both sides. Repetition of stacking an A cycle in FIG. 6 forms a fuel cell stack.

The solid polymer fuel cells generate heat involved in the reaction. In order to maintain the solid polymer films at suitable temperature, the stack must be cooled. The channels of the separators can also be used as flow paths of coolant water. The stack can be cooled by inserting a B stack cycle in FIG. 6 containing coolant water paths into the stack cycle at a suitable interval.

The material of the seal plate 10 is satisfactory so long as the material has a suitable elasticity and shows neither decomposition nor plastic deformation at temperatures up to the boiling point of the coolant water. Silicone resin, butadiene rubber resin, fluororesin, or the like can be used as the seal plate material. Gas used in the fuel cells can be sealed by clamping seal plates which are slightly thicker than the channel heights. Moreover, when the seal plates of a material as mentioned above are made to have a suitable elasticity, the seal plates can follow a fine deformation of the separator, etc. In FIG. 6, the fuel cells have a form in which the flow path of the hydrogen side and the flow path of the oxygen side face each other while the solid polymer film is sandwiched between both paths. However, the form is not restricted to the above, and there may be a form in which both flow paths cross.

Figure 7:
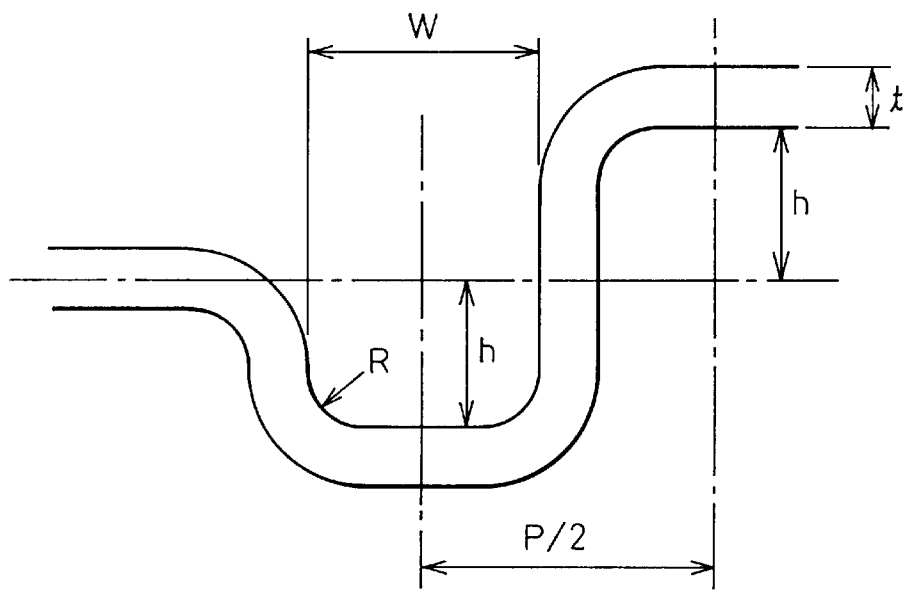
FIG. 7 is a view schematically showing the cross-sectional shape of a separator of the present invention.

FIG. 7 shows the cross-sectional shape of a channel according to the present invention.

The channel pitch of the separator is desirably smaller in view of the uniformity of a gas supply and current collecting efficiency. Moreover, it is desirable from the standpoint of decreasing a contact resistance that the separator have a large contact area with the electrode. However, when the channel pitch becomes small in comparison with the plate thickness, the bending strain increases. Furthermore, when the radius of curvature of the shoulder portion is made small or the length of the flat portion is extended in order to increase the contact area, the strain increases, and the separator cannot be formed because ruptures occur during forming. A channel having a channel pitch from 2 to 3 mm and a channel depth of about 1 mm (maximum) has commonly been used as flow paths of the separator for fuel cells. However, when metal plates having a thickness of about 0.1 to 0.3 mm are formed, the plates have often been broken in the shoulder portions during forming because the channel shape is fine in comparison with the plate thickness and the bending strain in the shoulder portion becomes significant.

The present inventors therefore have prepared prototype molds having various shapes, and have press formed various materials. As a result, they have found that the separator can be formed by designing the mold while a channel pitch, a channel depth, a radius of curvature of the shoulder portion and a length of the parallel portion are being appropriately related to a thickness, an elongation and a yield stress of the material.

Specifically, the present inventors have made the following discoveries. When the depth H (mm) of each channel of the separator is made equal to or less than a value calculated by the following formula:

$$H=2\times W\times (EL/YS)^{1.01}\times (R/T)^{0.318}\times (1-W/P))^{2.66}$$

wherein P (mm) is a channel pitch of the channel, R (mm) is a radius of the shoulder portion of the channel, W (mm) is a length of the parallel portion of the channel, t (mm) is a thickness of the separator, EL (%) is an elongation of a material used for the separator and YS (kgf/mm$^2$) is a yield stress of the material used therefore, the separator can be formed without rupturing. Moreover, the cross-sectional area of the flow path of the channel can be ensured by making the channel depth H (mm) about equal to the value calculated by the above formula.

Figure 8:
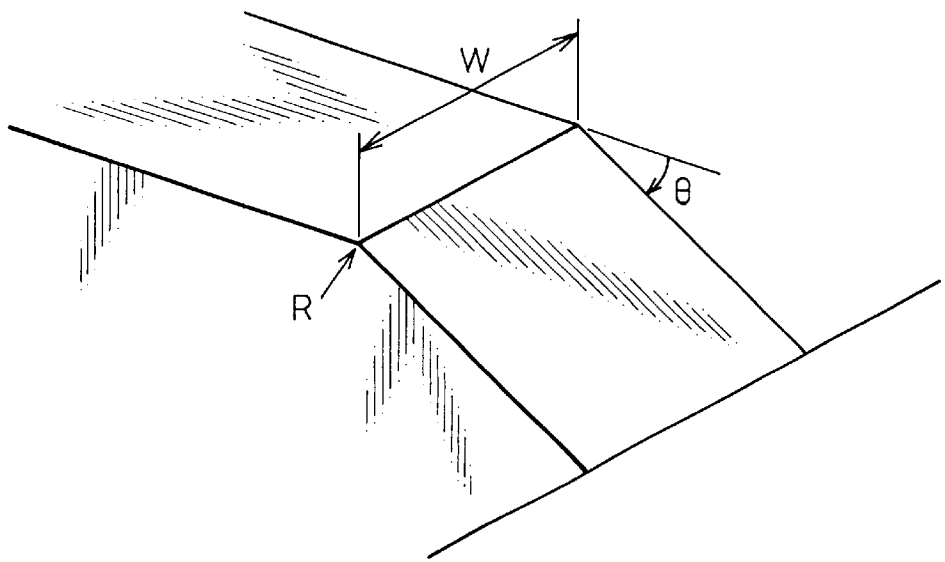
FIG. 8 is a view schematically showing the shape of a channel end portion of a separator of the present invention.

FIG. 8 shows a shape of the channel end portion of a separator according to the present invention.

The tilting angle θ (degrees) that defines the shape of the channel end portion is desirably a right angle from the standpoint of suppressing diversion of the gas to the downstream side. However, as explained above, when the tilting angle was increased, the bending strain increased in the corner portions, and the corner portions were often broken during forming.

The present inventors therefore have prepared prototype molds having various shapes, and have press formed various materials. As a result, they have found that the separator can be formed by designing the mold while a radius of curvature in the shoulder portion and a length of the parallel portion are appropriately related to the thickness, the elongation and the yield stress of the material.

Specifically, the present inventors have made the following discoveries. When the tilting angle θ (degrees) of each channel end portion of the separator is made equal to or less than a value calculated by the following formula:

$$\theta=90\times (EL/YS)^{0.372}\times (R/t)^{0.270}\times (W/t)^{-0.265}$$

wherein R (mm) is a radius of the shoulder portion of the channel, W (mm) is a length of the parallel portion of the channel, t (mm) is a thickness of the separator, EL (%) is an elongation of a material used for the separator and YS (kgf/mm$^2$) is a yield stress, the separator can be formed without rupture. Moreover, the gas can be prevented from diverting to the downstream side by making the tilting angle θ (degrees) about equal to the value calculated by the above formula.

Figure 9:
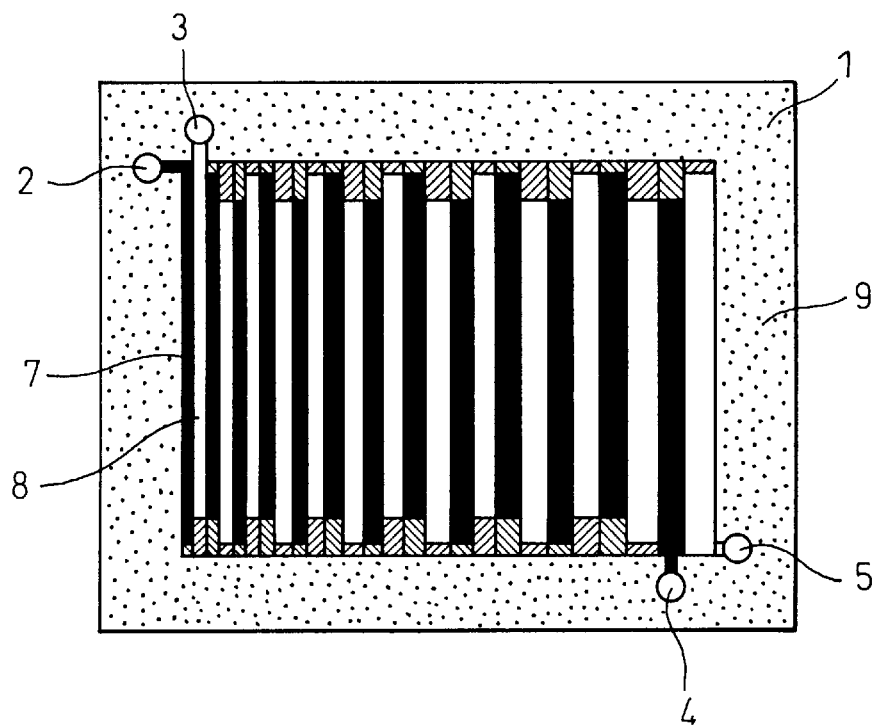
FIG. 9 is a plan view illustrating still another separator of the present invention.

FIG. 9 shows one embodiment of a channel arrangement in which the cross-sectional area of a channel in the present invention is increased toward the downstream end of the flow path. In general, the gas pressure falls as the gas flows downstream along the flow path due to pressure loss. On the other hand, a higher gas pressure is desirable in view of the catalyst reaction efficiency. Moreover, a smaller pressure difference between the hydrogen side and the oxygen side is desirable in view of the strength of the solid polymer film. The pressure lowering can be decreased by increasing a cross-sectional area of the flow path as the gas flows downstream. The pressure difference between both sides of the solid polymer film can be decreased without increasing the capacity of the pump of gas supply. Although the flow path width is gradually increased in FIG. 9, no problem arises even when the depth of the flow path is gradually increased, or both the depth and width are simultaneously changed. Moreover, a gradual increase or decrease of the width and depth of the flow path promotes a material inflow from the surrounding during forming in press forming, and is effective in conducting press forming easily.

Figure 10:
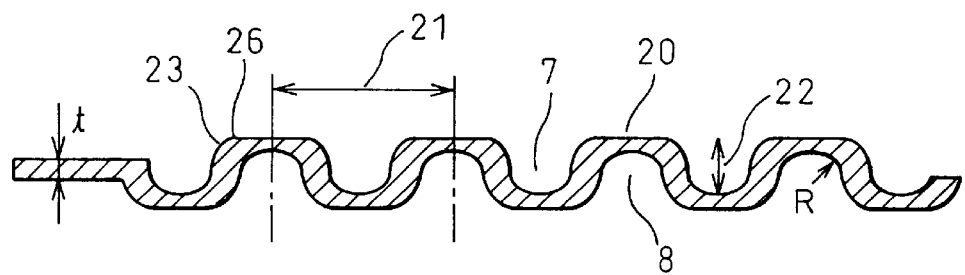
FIG. 10 is a view schematically showing the cross-sectional shape of another separator of the present invention.

Furthermore, the present inventors have prepared prototype molds having various shapes, and have press formed various materials. As a result, they have discovered that when press forming is conducted so that a cross-sectional shape in which a flat portion 20 is situated on the surface outside a protruded portion or a recessed portion is formed in the transverse cross section of the gas flow path as shown in FIG. 10, a separator can be formed without rupture.

A width of the flat portion 20 is desirably made large to increase the area to be in contact with the electrode from the standpoint of lowering a contact resistance. The width is preferably formed so that the flat portion has an area that is at least 20% of the projected area of the electrode portion forming the flow path. The contact resistance then becomes small, and the output of the fuel cell is improved. On the other hand, in order to promote the chemical reaction, to obtain a predetermined electromotive force and to uniformly supply fuel gas over the entire electrode surface, the width is preferably formed so that the flat portions have an area that is up to 50% of the projected area.

Figure 11:
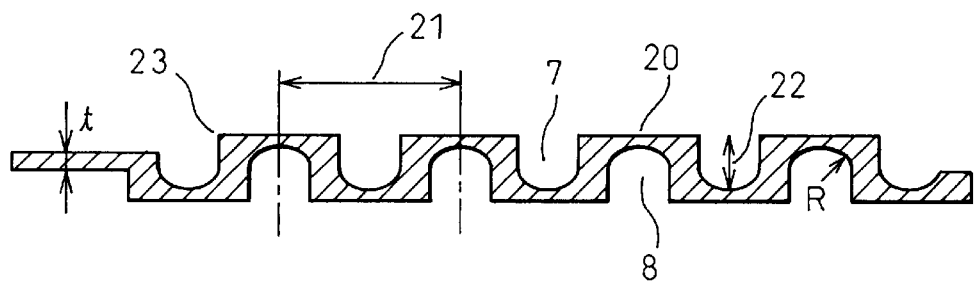
FIG. 11 is a view schematically showing the cross-sectional shape of still another separator of the present invention.
Figure 14:
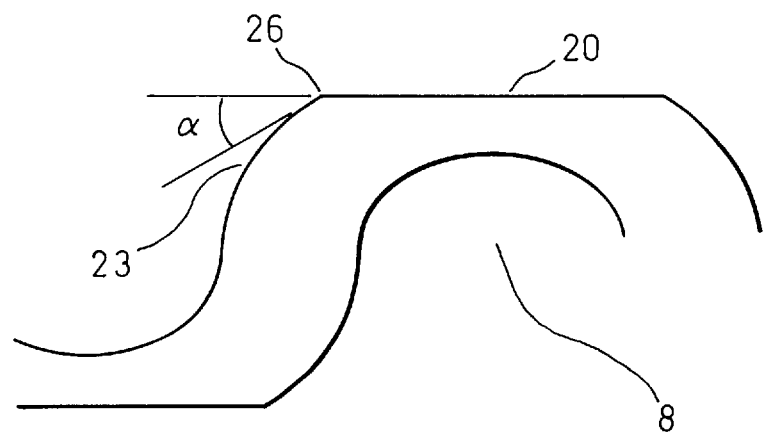
FIG. 14 shows an enlarged view of the bent portion of a separator of the present invention.

Furthermore, a connecting portion of the flat portion 20 and the shoulder portion 23 preferably has a bent portion 26. When the separator of the present invention is made to have the bent portion 26, the contact area of the flat portion 20 and the electrode (carbon fiber current collector) 11 is ensured and a predetermined contact resistance can be obtained. When the shoulder portion 23 has a curvature as shown in FIG. 14, a tangential line in the bent portion 26 of the shoulder portion 23 preferably makes an angle α of at least 30 degrees with the flat portion 20 in order to ensure a necessary area is in contact with the electrode. On the other hand, in order to promote a chemical reaction, to give a predetermined electromotive force, and to uniformly supply fuel gas over the entire electrode surface, the angle α is preferably up to 90 degrees. Moreover, as shown in FIG. 11, the shape of the shoulder portion 23 may be a cross-sectional shape that has no R portion and that makes an acute angle with the flat portion. In addition, the shape of the shoulder portion 23 is determined by a mold shape and the stroke during press forming.

Furthermore, the entire upper bottom portion of the protruded portion and the entire lower bottom portion of the recessed portion on the internal side surfaces of the protruded and the recessed portion preferably are curved with a curvature of at least 50·t/EL (mm). It has been found that the separator can then be press formed without rupture because the pressing strain lowers the breaking strain. In order to prevent rupture in the upper bottom portion and the lower bottom portion, the curvature of the upper bottom portion and that of the lower bottom portion are preferably made at least 50·t/EL (mm). In order to promote the chemical reaction to generate a predetermined electromotive force, and to uniformly supply the fuel gas over the entire electrode surface, the curvatures are preferably made up to 1 (mm).

Figure 12:
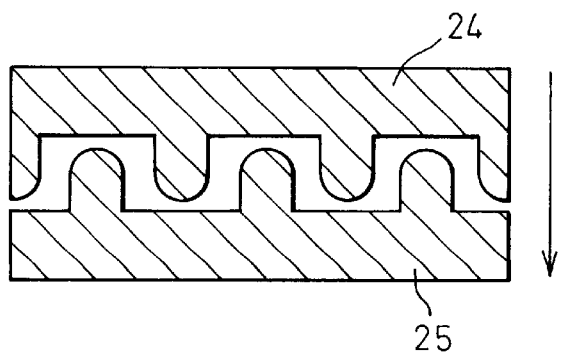
FIG. 12 is a view illustrating the cross-sectional shape of a mold for forming a separator.

FIG. 12 shows an embodiment of the cross-sectional shape of a mold for forming a separator of the present invention. The mold has a cross-sectional shape approximately similar to those of the channels of the separators shown in FIGS. 10 to 11. A top force 24 shown in FIG. 12 is gradually increased to press form a separator. In the press forming, stretch forming is conducted as the mold is pushed, and channel portions are formed. Coining is conducted by further increasing the top force, and a flat portion 20 having a predetermined width is formed on the surfaces outside the protruded portion and the recessed portion. The mold shape is not restricted to that shown in FIG. 12, and a mold completely similar to the cross-sectional shape of the separator may also be used.

EXAMPLE 1

Figure 13:
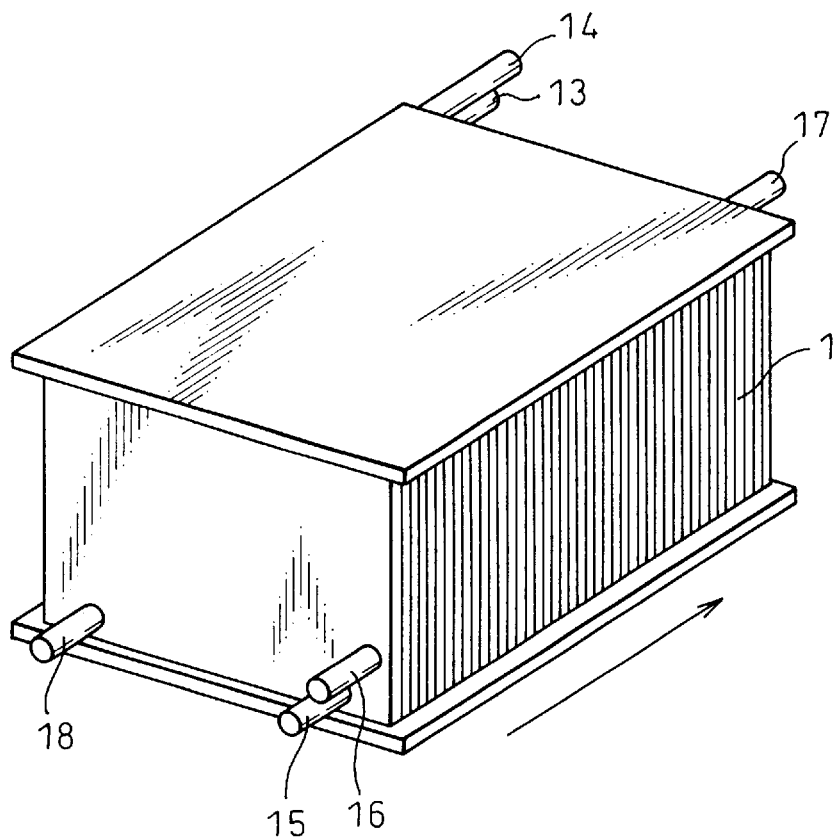
FIG. 13 is a view showing one embodiment of prototype solid polymer fuel cells for which separators of the present invention are used.

Prototype solid polymer fuel cells were prepared according to the present invention, and the gas sealing ability and power generation capacity were confirmed. FIG. 13 shows a fuel cell stack having a stacked structure shown in FIG. 6. The vertical direction in FIG. 6 corresponds to arrows in FIG. 13.

Bolt holes were provided to the four corners of each member for the purpose of positioning and applying a total pressure, and the stack was clamped (the clamped state being omitted in FIG. 6) using high tensile strength bolts and a rigid end plate. An A cycle shown in FIG. 6 was repeated four times, and a B cycle was placed every four A cycles, whereby 200 unit cells in total were stacked. The fuel cells had dimensions of 250 mm×250 mm×150 mm (height).

The flow path portion of one separator had dimensions of 100 mm×200 mm. A 20Cr-15Ni-3Mo austenitic stainless steel 0.2 mm thick was used as a separator. A commercially available perfluorosulfonic acid ion-exchange film was used as a solid polymer film. A commercially available carbon black-supported platinum was used as an electrode catalyst. Commercially available porous carbon paper was used as a carbon fiber current collector. Using the above materials, prototype solid polymer fuel cells were prepared. Moreover, the following two types of separators were prepared and used: a separator with a constant channel pitch; and a separator with a channel pitch increasing toward the downstream end.

The channel arrangements will be explained below. In Example (1), a channel arrangement in which each channel is continuously formed was employed, as shown in FIGS. 1 to 3. A smaller tilting angle θ of the channel end portions was made 5.7 degrees (=0.5/5.0). In Example (2), a channel arrangement in which each channel is continuously formed was employed, as shown in FIG. 9. A smaller tilting angle θ of the channel end portions was made 5.7 degrees. A silicone resin 0.6 mm thick was used as a seal plate.

In the solid fuel cells shown in FIG. 13, a side cap was provided to a coolant water inlet 17 to supply coolant water from the stack side; a side cap was provided to a coolant water outlet 18 to discharge the coolant water from the stack side. The cap end portions contacted with the stack were sealed with a silicone resin to prevent water leakage. Reference numerals 13, 15 designate an inlet and an outlet of a fuel gas, respectively. Reference numerals 14, 16 designate an inlet and an outlet of an air gas, respectively.

The separators could be press formed without rupture. Similar prototype solid polymer fuel cells were operated at 80° C. while hydrogen, as a fuel gas, and air were humidified, at 90° C., and supplied to generate power. All the solid polymer fuel cells showed neither gas leakage nor water leakage. Moreover, power generation with a release voltage value of about 90 V and a short-circuit current of about 100 A was confirmed. As explained above, it was confirmed that the fuel cells using the separators of the present invention functioned well.

EXAMPLE 2

The flow path portion of one separator had dimensions of 100 mm×200 mm. A 20Cr-15Ni-3Mo austenitic stainless steel 0.2 mm thick was used as a separator. A commercially available perfluorosulfonic acid ion-exchange film was used as a solid polymer film. Commercially available carbon black-supported platinum was used as an electrode catalyst. Commercially available porous carbon paper was used as a carbon fiber current collector. Using the above materials, prototype solid polymer fuel cells were prepared in the same manner as in Example 1. Moreover, a prototype separator having a channel shape with a constant pitch was prepared by press forming using a top and a bottom having configurations similar to the channel shape. A channel arrangement in which each channel is continuously formed was employed, as shown in FIGS. 1 to 3. The cross-sectional shape of the channel is shown in FIG. 10. The channel had the following dimensions: a radius of curvature in the shoulder portion of 0.3 mm; a curvature of the upper bottom portion inside a protruded portion of 0.3 mm; a curvature of the lower bottom portion inside a recessed portion of 0.3 mm; a width of a flat portion of 0.5 mm; a channel pitch of 1.55 mm; and a channel depth of 0.5 mm (maximum). Solid fuel cells as shown in FIG. 13 were prepared in the same manner as in Example 1.

The separators could be press formed without rupture. Such prototype solid polymer fuel cells were operated at 80° C. while hydrogen, as a fuel gas, and air were being humidified, at 90° C., and supplied to generate power. The solid polymer fuel cells in Example 2 also showed neither gas leakage nor water leakage. Moreover, power generation with a release voltage value of about 90 V and a short-circuit current of about 100 A was confirmed. As explained above, it was confirmed that the fuel cells using the separators of the present invention functioned well.

Separators for solid polymer fuel cells can be produced by press forming a highly corrosion-resistant stainless steel or titanium in the present invention. Accordingly, the technologies of the present invention are extremely effective in realizing solid polymer fuel cells at low cost.

What is claimed is:

1. A separator for solid polymer fuel cells comprising:
   a flat peripheral portion and
   channels in the central portion composed of protruded portions and recessed portions which provide different flow paths for gases on the front surface and the back surface of the central portion, is characterized by
   the channel end portions of each of the channels being tilted.

2. The separator for solid polymer fuel cells according to claim 1, wherein the tilting angle θ (degrees) of the channel end portions is varied from channel to channel.

3. The separator for solid polymer fuel cells according to claim 1, wherein the depth H (mm) of each channel is made equal to or less than a value calculated by the following formula:

$$H = 2 \times W(EL/YS)^{1.01} \times (R/T)^{0.318} \times (1-W/P)^{2.66}$$

wherein P (mm) is a channel pitch of the channel, R (mm) is a radius of the shoulder portion of the channel, W (mm) is a length of the parallel portion of the channel, t (mm) is a thickness of the separator, EL (%) is an elongation of a material used for the separator and YS (kgf/mm$^2$) is a yield stress of the material used therefor.

4. The separator for solid polymer fuel cells according to claim 1, wherein the tilting angle θ (degrees) of each channel end portion is made equal to or less than a value calculated by the following formula:

$$\theta = 90 \times (EL/YS)^{0.372} \times (R/t)^{0.270} \times (W/t)^{-0.265}$$

wherein R (mm) is a radius of the shoulder portion of the channel, W (mm) is a length of the parallel portion of the channel, t (mm) is a thickness of the separator, EL (%) is an elongation of a material used for the separator and YS (kgf/mm$^2$) is a yield stress of the material used therefor.

5. The separator for solid polymer fuel cells according to claim 1, wherein in the transverse cross section of a gas flow path formed by the repetition of a protruded portion and a recessed portion of the channel, the outside surface of each protruded portion and that of each recessed portion each have a flat portion, and the shoulder portion of each protruded portion and that of each recessed portion each have a curved portion having a constant curvature.

6. The separator for solid polymer fuel cells according to claim 5, wherein the connecting portion of the flat portion and the shoulder portion has a bent portion.

7. The separator for solid polymer fuel cells according to claim 5, wherein the entire upper bottom portion and the entire lower bottom portion on the inside surfaces of the protruded portion and the recessed portion are curved with a constant curvature.

8. The separator for solid polymer fuel cells according to claim 5, wherein the following formula is satisfied:

$$EL \geq 50 \cdot t/R$$

wherein R (mm) is a curvature of the shoulder portion, or the upper bottom portion and the lower bottom portion, EL (%) is an elongation of the above material, and t (mm) is a thickness of the above plate.

9. The separator for solid polymer fuel cells according to claim 1, wherein the separator has a seal member that seals both flat faces of the peripheral portion.

10. The separator for solid polymer fuel cells according to claim 1, wherein the cross-sectional area of the channel increases toward the downstream end of the gas flow path.

11. The separator for solid polymer fuel cells according to claim 1, wherein the separator is made of a stainless steel or titanium.

12. A method for producing a separator for solid polymer fuel cells, comprising press forming with a mold having a configuration similar to the external shape of the separator for solid polymer fuel cells according to claim 1.

13. Solid polymer fuel cells comprising the separators for solid polymer fuel cells according to claim 1.

* * * * *